US012518697B2

(12) United States Patent
Agarwal et al.

(10) Patent No.: US 12,518,697 B2
(45) Date of Patent: Jan. 6, 2026

(54) BRIGHTNESS BASED PIXEL DRIVER POWER REDUCTION SYSTEMS AND METHODS

(71) Applicant: Apple Inc., Cupertino, CA (US)

(72) Inventors: Shatam Agarwal, San Jose, CA (US); David S Zalatimo, San Jose, CA (US); Fenghua Zheng, San Jose, CA (US); Jason N Gomez, Campbell, CA (US); Nikolaus Hammler, San Mateo, CA (US); Patrick R Cruce, Campbell, CA (US); Vehbi Calayir, Santa Clara, CA (US); Yue Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/883,524

(22) Filed: Sep. 12, 2024

(65) Prior Publication Data

US 2025/0095576 A1 Mar. 20, 2025

Related U.S. Application Data

(60) Provisional application No. 63/583,800, filed on Sep. 19, 2023.

(51) Int. Cl.
*G09G 3/3225* (2016.01)
*G09G 3/20* (2006.01)
*G09G 3/3233* (2016.01)

(52) U.S. Cl.
CPC ......... *G09G 3/3233* (2013.01); *G09G 3/2007* (2013.01); *G09G 2330/021* (2013.01); *G09G 2330/028* (2013.01)

(58) Field of Classification Search
CPC ............... G09G 3/3233; G09G 3/2007; G09G 2330/021; G09G 2330/028; G09G 3/3291; H03M 1/1019
See application file for complete search history.

(56) References Cited

U.S. PATENT DOCUMENTS

| | | | |
|---|---|---|---|
| 7,110,009 | B2 | 9/2006 | Ooishi et al. |
| 7,948,418 | B2 | 5/2011 | Cho et al. |
| 9,508,292 | B2 | 11/2016 | Xie |
| 9,721,502 | B2 | 8/2017 | Bi et al. |
| 10,636,359 | B2 | 4/2020 | Zhang et al. |
| 11,562,705 | B2 | 1/2023 | Cho |
| 2006/0007249 | A1 | 1/2006 | Reddy et al. |
| 2008/0303767 | A1 | 12/2008 | Ludden et al. |
| 2019/0086992 | A1* | 3/2019 | Lin ..................... G09G 3/3233 |

(Continued)

OTHER PUBLICATIONS

Woo, Jae-Hyuck, et al.; "Accurate Quadruple-Gamma-Curve Correction for Line Inversion-Based Mobile TFT-LCD Driver ICs," IEEE Transactions on Consumer Electronics, vol. 59, No. 3, Aug. 2013, pp. 443-451.

*Primary Examiner* — Abdul-Samad A Adediran
(74) *Attorney, Agent, or Firm* — Fletcher Yoder, P.C.

(57) ABSTRACT

An electronic device may include a display panel having display pixels and pixel drive circuitry that drives the display pixels based on a set of analog voltages according to display image data. Additionally, the electronic device may include a gamma generator to generate the set of analog voltages and voltage regulating circuitry that adjusts a supply voltage to a portion of the gamma generator based on a brightness setting of the display panel.

20 Claims, 9 Drawing Sheets

(56) References Cited

U.S. PATENT DOCUMENTS

| | | | | |
|---|---|---|---|---|
| 2020/0211457 | A1* | 7/2020 | Kim | G09G 3/3233 |
| 2021/0280138 | A1* | 9/2021 | Yum | G09G 3/3291 |
| 2022/0037418 | A1 | 2/2022 | Han et al. | |
| 2022/0198980 | A1 | 6/2022 | Sun | |
| 2023/0087480 | A1* | 3/2023 | Ryu | H03M 1/1019 345/204 |

* cited by examiner

BRIGHTNESS BASED PIXEL DRIVER POWER REDUCTION SYSTEMS AND METHODS

CROSS-REFERENCE TO RELATED APPLICATIONS

This application claims priority to U.S. Provisional Application No. 63/583,800, filed Sep. 19, 2023, entitled "Brightness Based Pixel Driver Power Reduction Systems and Methods," which is incorporated herein by reference in its entirety.

SUMMARY

The present disclosure generally relates to systems and methods for changing operations of pixel drive circuitry of an electronic display based on a brightness setting of the electronic display. Indeed, in some embodiments, such changes in operations may improve the power efficiency of the pixel drive circuitry.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To provide suitable power to display pixels for displaying an image, pixel drive circuitry may utilize one or more reference voltages, such a set of gamma reference voltages (e.g., supplied by a gamma generator) to achieve the desired luminance values (e.g., gray levels for each color component). For example, in some embodiments, the different voltage levels may be achieved via one or more digital to analog converters (DACs), amplifiers, and/or resistor strings. Furthermore, the circuitry of the gamma generator may operate based on (e.g., be powered by) a supply voltage. In some embodiments, the gamma generator may output multiple different voltage levels corresponding to the digital values (e.g., gray levels) of the image data, and pixel drive circuitry may select and apply certain voltage levels to the display pixels based on the image data.

In addition to the image data, the brightness setting of the electronic display may be utilized to determine the desired voltages and/or currents to be applied to the display pixels. Additionally, at different brightness settings, different voltage levels and/or currents may or may not be utilized. For example, for a given brightness setting, the reference voltages may not exceed a corresponding threshold. As such, in some embodiments, the generated reference voltages sent to the pixel drive circuitry and, thus, the supply voltages to portions of the gamma generator and/or pixel drive circuitry may be reduced based on the brightness setting. By reducing the supply voltages of the gamma generator and/or pixel drive circuitry, power consumption may be reduced.

Additionally or alternatively, in some embodiments, portions of the gamma generator, such as sets of amplifiers buffering tap voltages and/or the analog reference voltages may operate based on bias currents that may be changed depending on the brightness setting. For example, one or more amplifiers of the gamma generator may be supplied with bias currents to buffer one or more gamma reference voltages. However, at reduced brightness levels, the voltage range of the reference voltages may be lower than those at higher brightness settings. As such, the amount of bias current to maintain adequate buffering of the reference voltages may be lower at lower brightness settings. As such, the bias of one or more amplifiers may be based on the brightness setting of the electronic display to increase power efficiency.

BRIEF DESCRIPTION OF THE DRAWINGS

Various aspects of this disclosure may be better understood upon reading the following detailed description and upon reference to the drawings described below.

DETAILED DESCRIPTION

Figure 1:
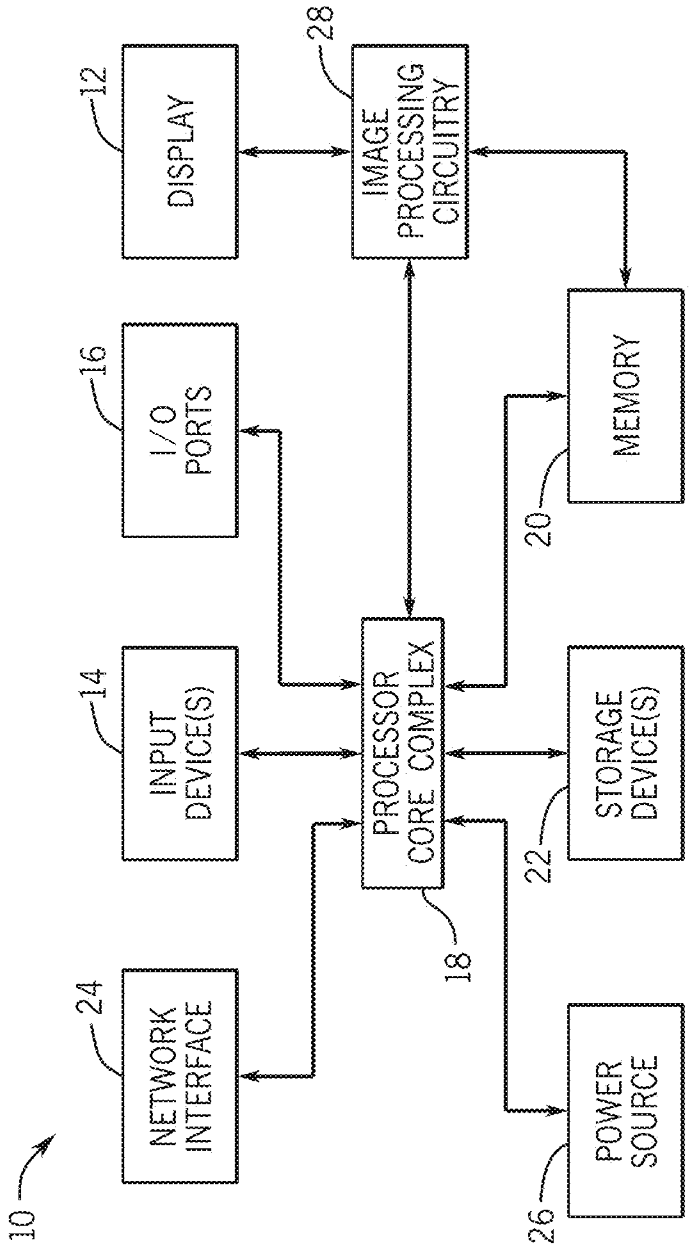
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. Additionally, the image data may be processed to account for one or more physical or digital effects associated with displaying the image data. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

In some embodiments, a brightness setting may define a global luminance output of the electronic display. For example, while display pixels of the electronic display have varied luminance and/or color outputs depending on the image data, the brightness setting (e.g., a display brightness value (DBV), global brightness setting, etc.) may regulate the total luminance output of the electronic display. As such, the voltages, currents, and/or duty cycle thereof provided to the display pixels may be adjusted based on the brightness setting and the image data. As should be appreciated, the brightness setting may be obtained/determined based on numerous factors such as but not limited to ambient lighting (e.g., received via an ambient light sensor), time of day, panel age, and/or a user setting.

To provide suitable power to the display pixels, pixel drive circuitry may utilize one or more reference voltages, such as a supply voltage and/or a set of gamma reference voltages (e.g., supplied by a gamma generator) to achieve the desired luminance values (e.g., gray levels for each color component). For example, in some embodiments, the different voltage levels may be achieved via one or more digital to analog converters (DACs), amplifiers, and/or resistor strings. In some embodiments, the gamma generator may output multiple different voltage levels corresponding to the digital values of the image data. For example, 8-bit image data per color component may correspond to a gamut of 256 different gray levels and, therefore, 256 different voltage levels per color component. As should be appreciated, the image data and corresponding voltage outputs may be associated with any suitable bit-depth and gray level values depending on implementation and the electronic display. Furthermore, the gamma generator may include more or fewer voltage outputs than the corresponding bit-depth of image data. For example, in some embodiments, the same voltage level may be used for multiple gray levels, and the current may be pulse-width modulated to obtain the different perceived luminance outputs.

As discussed herein, in addition to the image data, the brightness setting of the electronic display may be utilized to determine the desired voltages and/or currents to be applied to the display pixels. Additionally, at different brightness settings, different voltage levels and/or currents may or may not be utilized. For example, for a given brightness setting, the reference voltages may not exceed a corresponding threshold. As such, in some embodiments, the generated reference voltages sent to the pixel drive circuitry and, thus, the supply voltages to portions of the gamma generator and/or pixel drive circuitry may be reduced based on the brightness setting. By reducing the supply voltages of the gamma generator and/or pixel drive circuitry, power consumption may be reduced.

Additionally or alternatively, in some embodiments, portions of the gamma generator, such as sets of amplifiers buffering tap voltages and/or the analog reference voltages may operate based on bias currents that may be changed depending on the brightness setting. For example, one or more amplifiers of the gamma generator may be supplied with bias currents to buffer one or more gamma reference voltages. However, at reduced brightness levels, the voltage range of the reference voltages may be lower than those at higher brightness settings. As such, the amount of bias current to maintain adequate buffering of the reference voltages may be lower at lower brightness settings. As such, the bias of one or more amplifiers may be based on the brightness setting of the electronic display to increase power efficiency.

With the foregoing in mind, FIG. 1 is an example electronic device 10 with an electronic display 12. As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by or received from an image source, such as the processor core complex 18, a graphics processing unit (GPU), storage device 22, or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
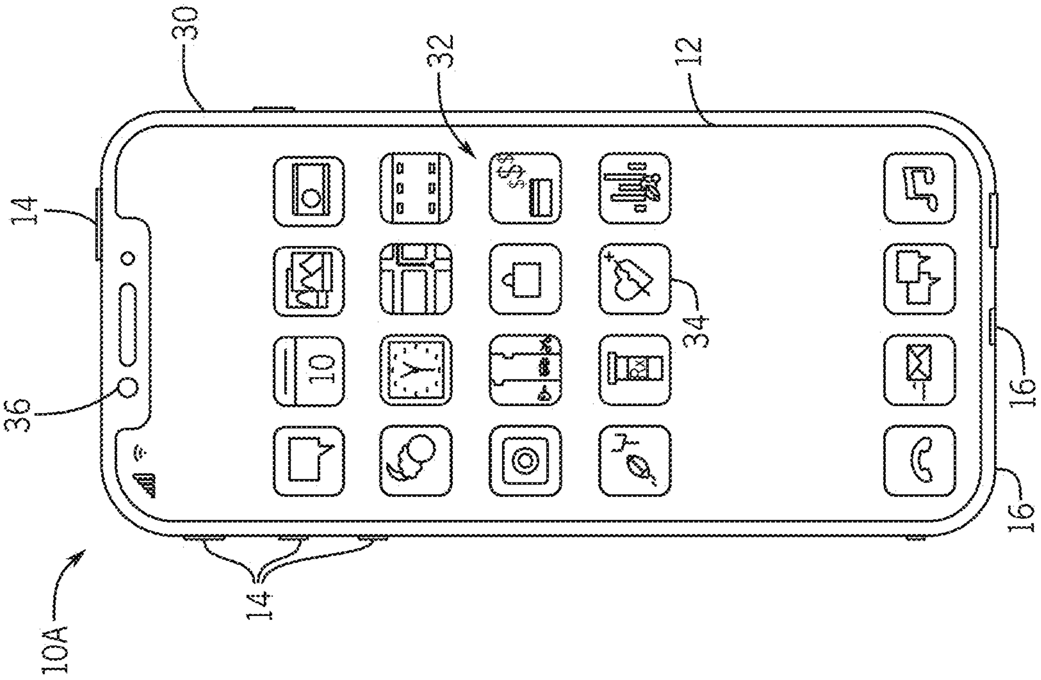
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
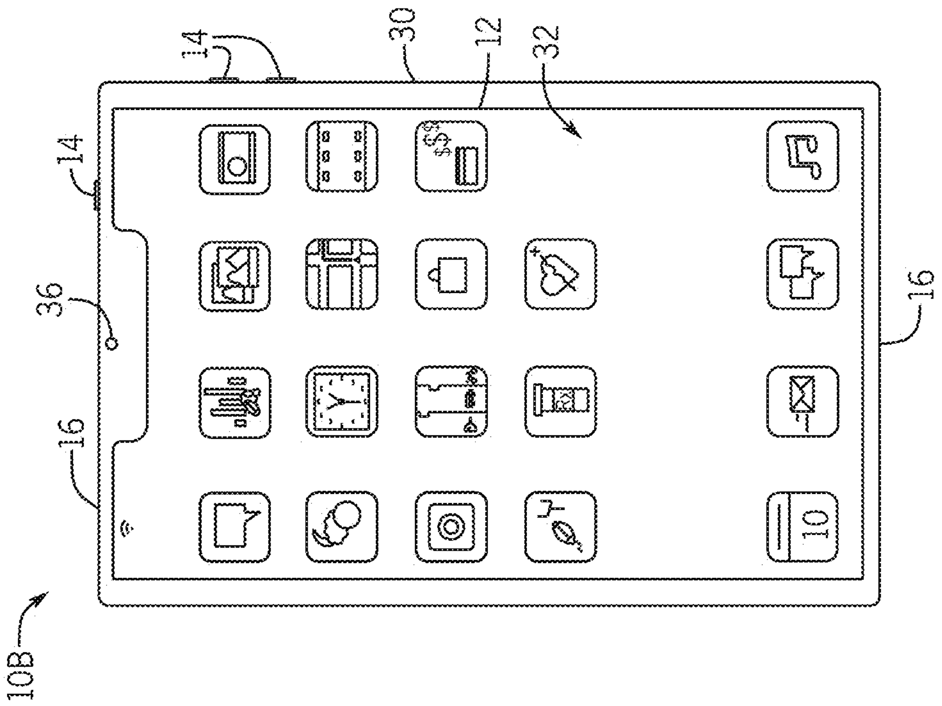
FIG. 3 is a front view of a tablet device representing an example of the electronic device of FIG. 1, in accordance with an embodiment.
Figure 4:
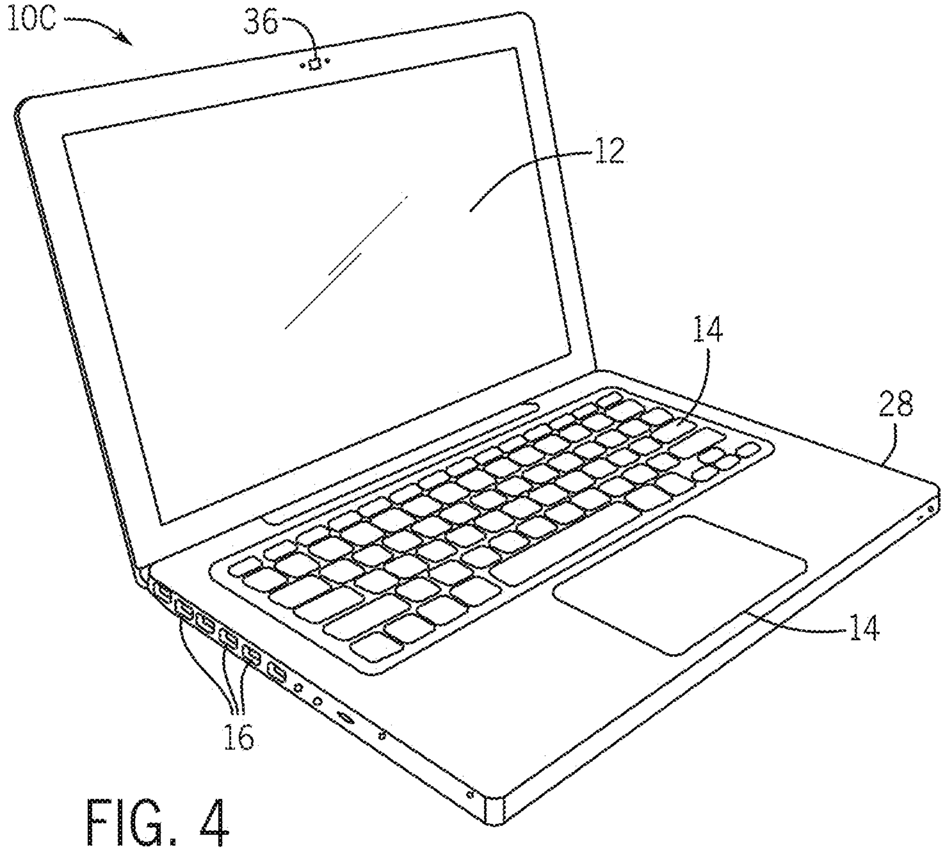
FIG. 4 is a front view of a notebook computer representing an example of the electronic device of FIG. 1, in accordance with an embodiment.
Figure 5:
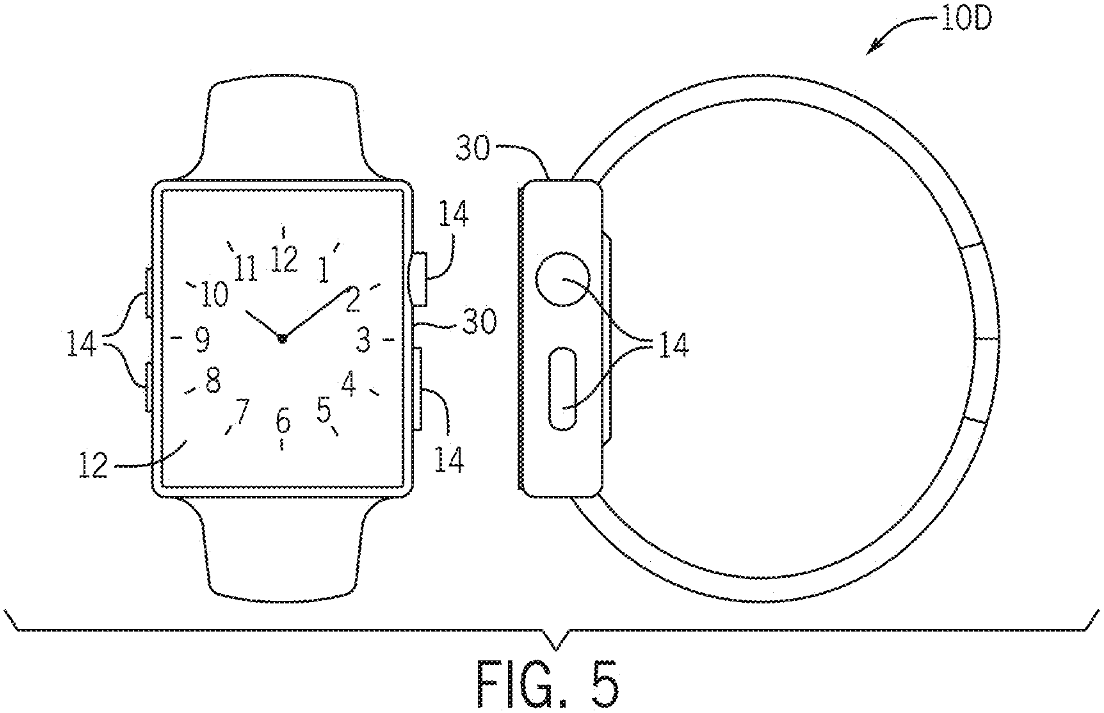
FIG. 5 is a front and side view of a watch representing an example of the electronic device of FIG. 1, in accordance with an embodiment.

Another example of a suitable electronic device 10, specifically a tablet device 10B, is shown in FIG. 3. For illustration purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
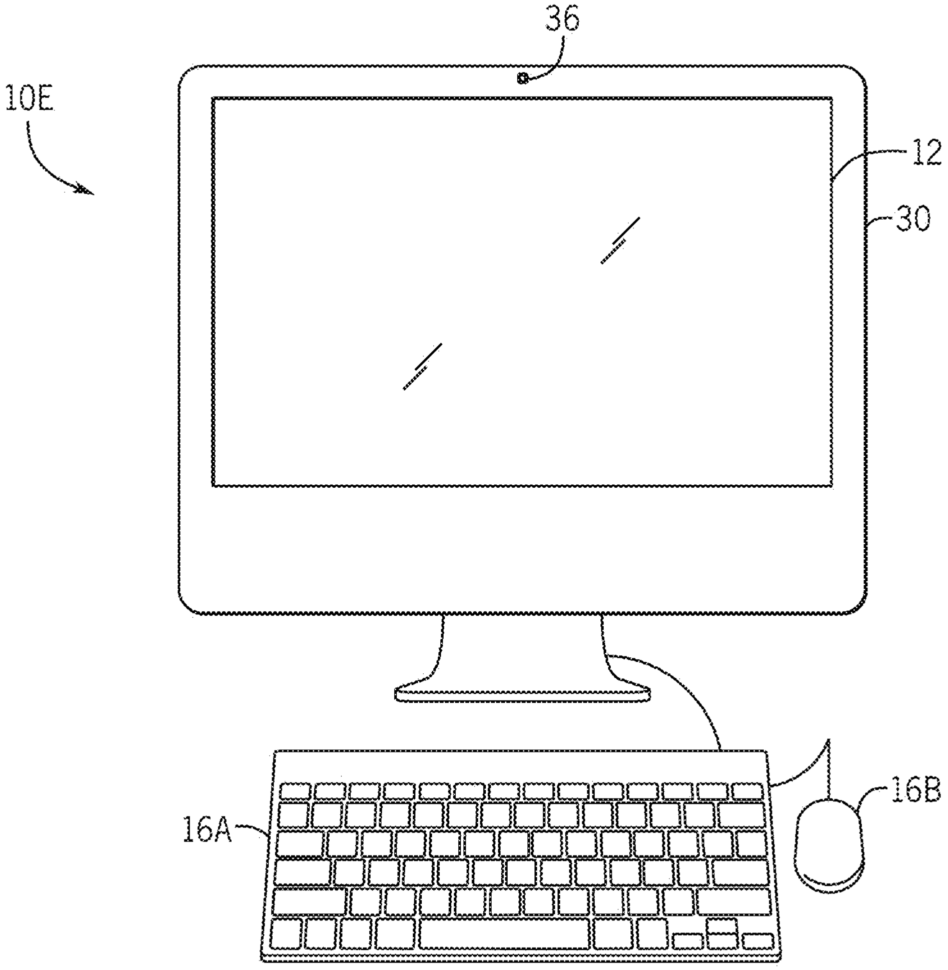
FIG. 6 is a front view of a computer representing an example of the electronic device of FIG. 1, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an IMAC®, a MACBOOK®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. Moreover, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
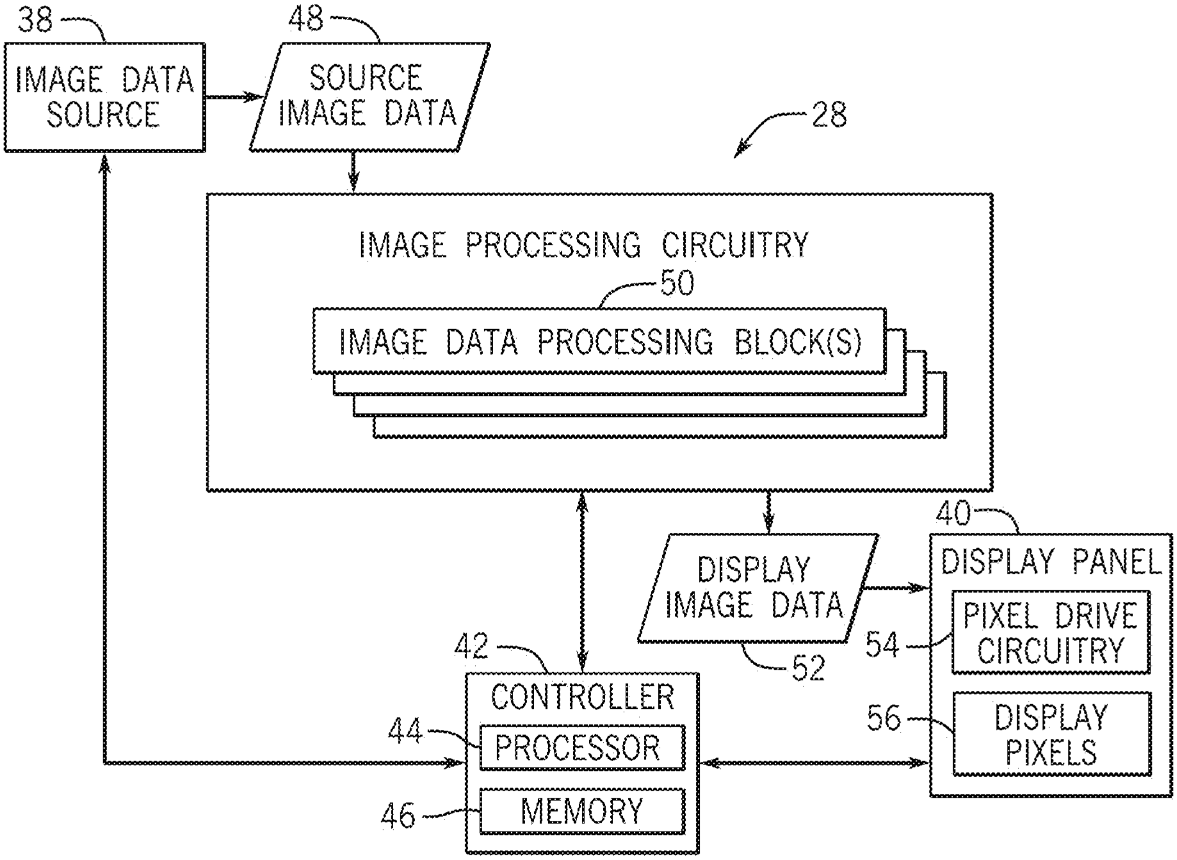
FIG. 7 is a block diagram of a portion of the image processing circuitry of FIG. 1 in communication with a display panel having pixel drive circuitry and display pixels, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware and/or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display (e.g., organic light-emitting-diode (OLED) display, micro-LED display, etc.), a transmissive display (e.g., liquid crystal display (LCD)), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller 42 (e.g., the controller processor 44 and/or controller memory 46) may be included in (e.g., a part of or implemented as) the processor core complex 18, the image processing circuitry 28, a timing controller (TCON) in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. Moreover, as used herein, pixel data/values of image data may refer to individual color component (e.g., red, green, and blue) data values corresponding to pixel positions of the display panel.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as a burn-in compensation (BIC)/burn-in statistics (BIS) block, a pixel contrast control (PCC) block, color management block, a dither block, a blend block, a warp block, a scaling/rotation block, etc. The image data processing blocks 50 may receive and process source image data 48 and output display image data 52 in a format (e.g., digital format, image space, and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50. After processing, the image processing circuitry 28 may output the display image data 52 to the display panel 40. Based at least in part on the display image data 52, analog electrical signals may be provided, via pixel drive circuitry 54, to display pixels 56 of the display panel 40 to illuminate the display pixels 56 at a desired luminance level and display a corresponding image.

Figure 8:
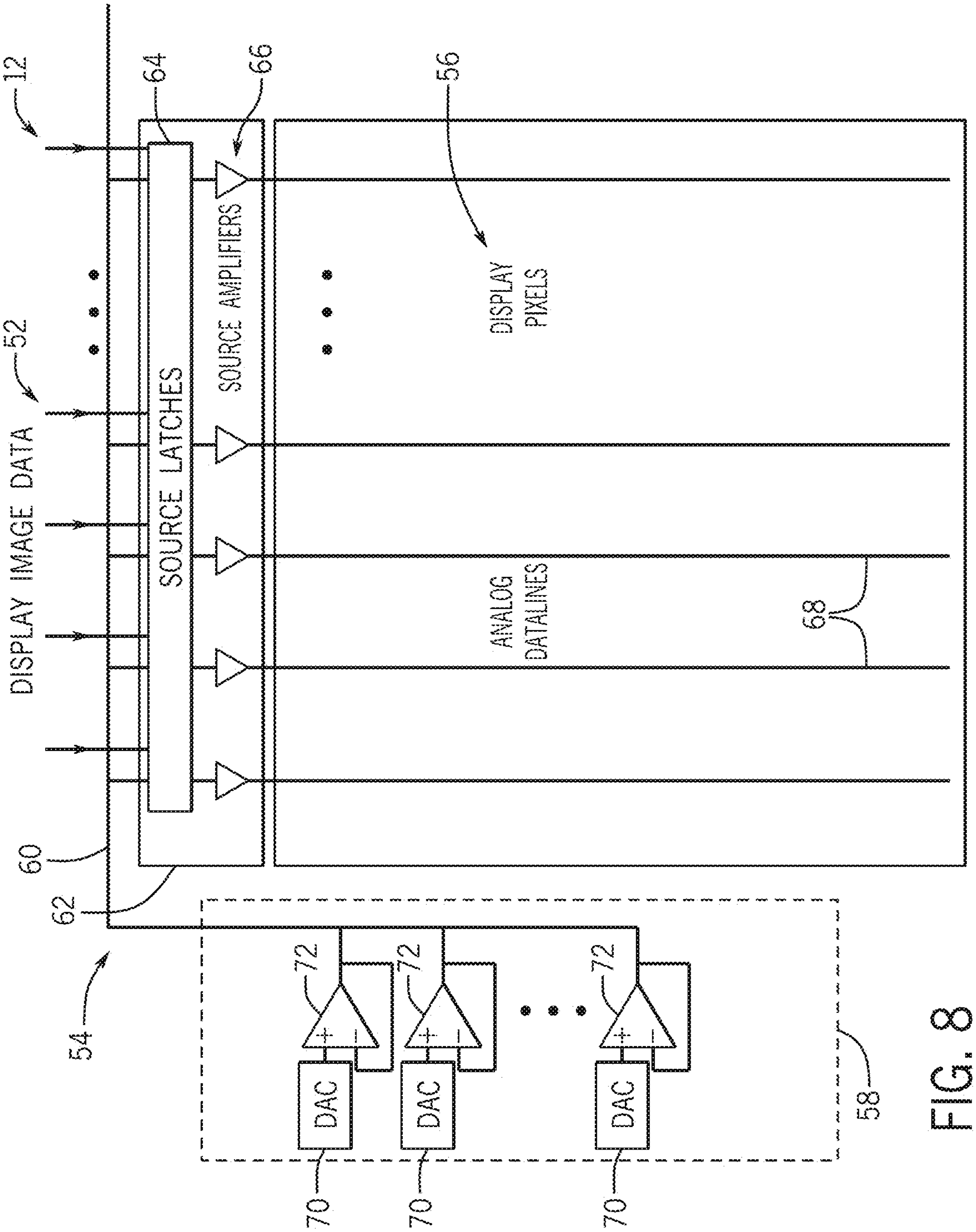
FIG. 8 is a schematic diagram of a gamma generator in electrical communication with a portion of an electronic display via a gamma bus, in accordance with an embodiment.

The pixel drive circuitry 54 may be utilized to provide suitable power to the display pixels 56. In some embodiments, the pixel drive circuitry 54 may generate one or more gamma reference voltages (e.g., supplied by a gamma generator) to be applied to the display pixels 56 to achieve the desired luminance outputs. To help illustrate, FIG. 8 is a schematic diagram of at least a portion of the electronic display 12, including the pixel drive circuitry 54 and the display pixels 56 in conjunction with a gamma generator 58. As described herein, the electronic device 10 may use one or more gamma generators 58 (e.g., a gamma generator 58 for each color component) and one or more respective gamma buses 60 for transmitting analog voltages to the display pixels 56 of an electronic display 12. A single gamma generator 58 with a single gamma bus 60 is discussed herein for brevity.

In some embodiments, the electronic display 12 may use analog voltages to power display pixels 56 at various voltages that correspond to different luminance levels. For example, the display image data 52 may correspond to original (e.g., source image data 48) or processed image data and contain target luminance values for each display pixel

56. As used herein, pixels or pixel data may refer to a grouping of sub-pixels (e.g., individual color component pixels such as red, green, and blue) or the sub-pixels themselves. Moreover, the pixel drive circuitry 54 may include one or more display drivers 62 (also known as source drivers, data drivers, column drivers, etc.), source latches 64, source amplifiers 66, and/or any other suitable logic/circuitry to provide the appropriate analog voltage(s) to the display pixels 56, based on the display image data 52. In some embodiments, the circuitry of the display drivers 62 or additional circuitry coupled thereto may include a DAC and/or multiplexer to select an analog voltage of the gamma generator 58 based on the display image data 52. As such, the pixel drive circuitry 54 may apply power at a corresponding voltage and/or current to a display pixel 56 to achieve a target luminance output from the display pixel 56, based on the display image data 52. Such power, at the appropriate analog voltages for each display pixel 56, may travel down analog datalines 68 to the display pixels 56.

As discussed further below, in some embodiments, the different analog voltages may be generated by the gamma generator 58 via one or more digital-to-analog converters (DACs) 70, amplifiers 72, and/or resistor strings (not shown). As discussed above, the different analog voltages supplied by the gamma bus 60 may correspond to at least a portion of the values of the display image data 52. For example, 8-bit display image data 52 per color component may correspond to 256 different gray levels and, therefore, 256 different analog voltages per color component. Indeed, display image data 52 corresponding to 8-bits per color component may yield millions or billions of color combinations and, in some embodiments, may include the brightness of the electronic display 12 for a given frame. As should be appreciated, the display image data 52 and corresponding voltage outputs may be associated with any suitable bit-depth depending on implementation and/or may use any suitable color space (e.g., RBG (red/blue/green), sRBG, Adobe RGB, HSV (hue/saturation/value), YUV (luma/chroma/chroma), Rec. 2020, etc.). Furthermore, the gamma bus 60 may include more or fewer analog voltages than the corresponding bit-depth of the display image data 52. For example, in some embodiments, the same analog voltages may be used for multiple gray levels, for example, via interpolation between analog voltages and/or pulse-width modulation of current flow to obtain the different perceived luminance outputs. In some embodiments, the gamma generator 58 and/or pixel drive circuitry 54 may provide the display pixels 56 with negative voltages relative to a reference point (e.g., ground). As should be appreciated, the positive and negative voltages may be used in a similar manner to operate the display pixels 56, and they may have mirrored or different mappings between voltage level and target gray level.

Additionally, in some embodiments, different color component display pixels 56 (e.g., a red sub-pixel, a green sub-pixel, a blue sub-pixel, etc.) may have different mappings between voltage level and target gray level. For example, display pixels 56 of different color components may have different luminance outputs given the same driving voltage/current. As such, in some embodiments, one or more gamma buses 60 may be used for each color component and/or voltage polarity. As should be appreciated, the mappings between voltage level and target gray level may depend on the type of display pixels (e.g., LCD, LED, OLED, etc.), the brightness setting, a color hue setting, temperature, contrast control, pixel aging, etc., and, therefore, may depend on implementation.

Figure 9:
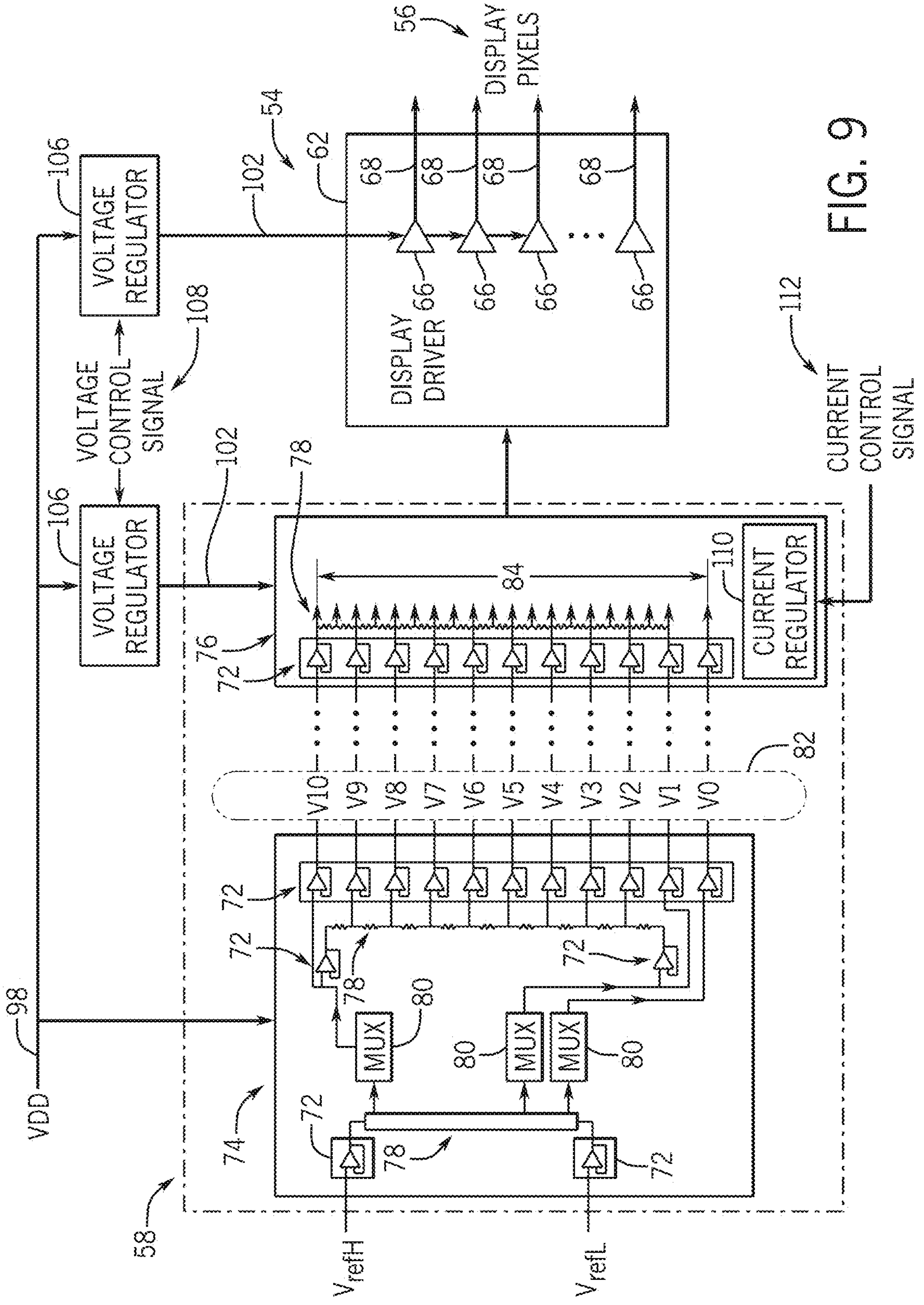
FIG. 9 is a schematic diagram of the gamma generator of FIG. 8, in accordance with an embodiment.

In some embodiments, the gamma generator 58 may include multiple stages, such as a first generator stage 74 and a second generator stage 76, as shown in FIG. 9. The first generator stage 74 may receive reference voltages (e.g., generated by a DAC 70 or other circuitry), such as a low reference voltage, $V_{ref\,L}$, and a high reference, $V_{ref\,H}$, which may correspond to voltages for the lowest and highest gray levels (e.g., for a given color component, brightness setting, and/or image frame) and/or provide a voltage differential therebetween for interpolating the analog voltages corresponding to the range of gray levels. Indeed, the low reference voltage and high reference voltage may or may not correspond to desired gray level voltages for a given image frame. Furthermore, the first generator stage 74 may utilize one or more resistor strings 78, multiplexers 80, amplifiers 72, DACs 70, and/or other circuitry to generate a set of tap voltages 82 based on the low reference voltage, $V_{ref\,L}$, and a high reference, $V_{ref\,H}$. The tap voltages 82 include two or more analog voltages that define a voltage span 84 of the analog output voltages of the gamma generator 58 (e.g., to be transmitted via the gamma bus 60). Furthermore, the tap voltages 82 may correspond to the voltage span 84 for the current brightness setting.

For a given gray level of the display image data 52 different brightness settings may correspond to different analog voltages levels. As such, in some scenarios, the voltage span 84 may vary based on the brightness setting of the electronic display 12. Additionally, in some embodiments, the high reference voltage, $V_{ref\,H}$, may be greater than or equal to the analog voltage corresponding to the maximum gray level at the maximum brightness level. Moreover, in some embodiments, the high reference voltage, $V_{ref\,H}$, and/or low reference voltage, $V_{ref\,L}$, may be held constant and the tap voltages 82 adjusted via the resistor string(s) 78, multiplexer(s) 80, amplifier(s) 72, DACs 70, and/or other circuitry. Additionally or alternatively, the high reference voltage, $V_{ref\,H}$, and/or low reference voltage, $V_{ref\,L}$, may be adjusted based on the brightness setting to generate the tap voltages 82.

In some embodiments, the tap voltages 82 may be utilized by the second generator stage 76 to generate additional analog voltages (e.g., a partial or full range of analog voltages corresponding to the range of gray levels at the current brightness setting). For example, the second generator stage 76 may include a resistor string 78, and the tap voltages 82 may be used as tap points (e.g., reference voltages) at two or more nodes of the resistor string 78. Additional nodes of the resistor string 78 provide additional analog voltages (e.g., separate from the tap voltages 82), such that, in the aggregate, the second generator stage 76 may output each voltage of the voltage span 84, for driving the display pixels 56 at corresponding gray levels of the display image data 52. Additionally, the second generator stage 76 may include multiple amplifiers 72 to buffer the tap voltages 82, the additional analog voltages of the resistor string 78, or both. Moreover, in some embodiments, the second generator stage 76 may include corresponding amplifiers 72 for certain (e.g., corresponding to the tap voltages 82) or all of the analog voltages output from the gamma generator 58.

Figure 10:
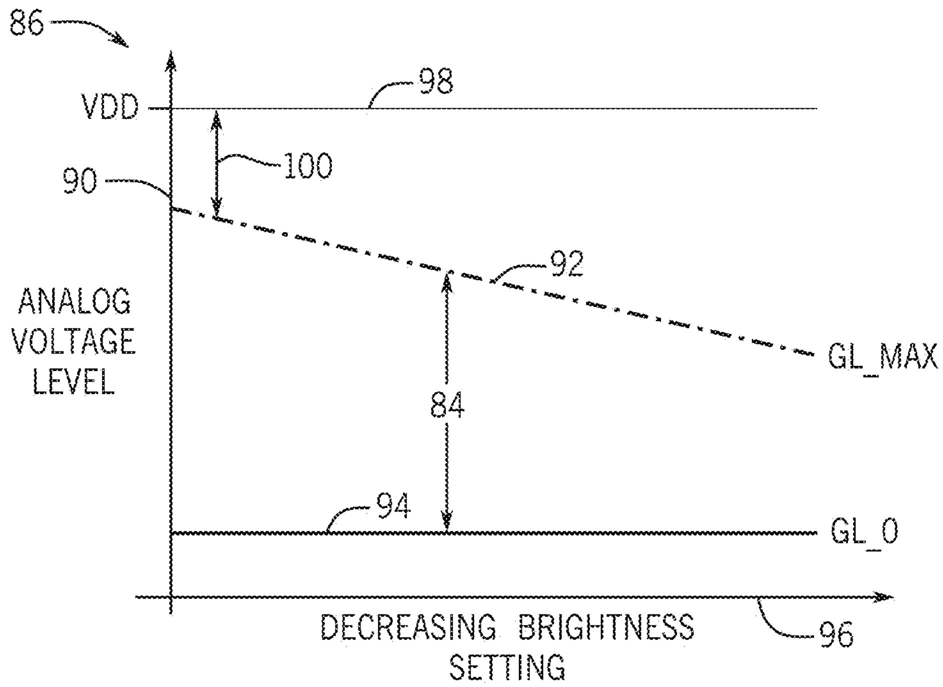
FIG. 10 is a graph of the analog voltage levels corresponding to a highest gray level and a zero gray level of a display panel, with respect to a decreasing brightness setting, in accordance with an embodiment.
Figure 11:
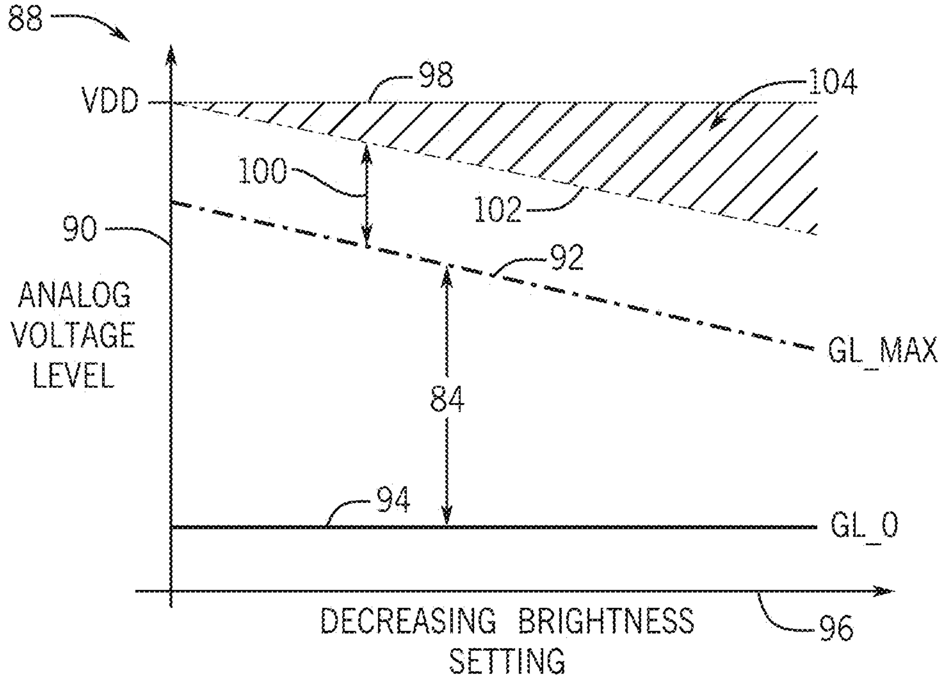
FIG. 11 is a graph of the analog voltage levels corresponding to a highest gray level and a zero gray level of a display panel, with respect to a decreasing brightness setting, in accordance with an embodiment.

As discussed herein, the analog voltages provided to the display pixels 56 may vary depending on the display image data 52 and brightness setting. To help illustrate, FIGS. 10 and 11 are graphs 86, 88 of the analog voltage level 90 for the highest gray level 92 (e.g., GL_MAX) and a zero gray level 94 (e.g., GL_0) as the brightness setting 96 decreases. In general, for some types of display pixels 56, such as NMOS pixels (e.g., oxide thin-film-transistor (TFT) pixels) or self-emissive pixels (e.g., LED pixels, OLED pixels, μLED pixels, etc.), for a given gray level, the corresponding analog voltage level 90 may decrease as the brightness setting 96 decreases. As should be appreciated, the above types of display panels 40 are given as non-limiting examples, and unless otherwise stated, the present techniques may be utilized with any suitable panel type. Additionally, the circuitry (e.g., resistor string(s) 78, multiplexer (s) 80, amplifier(s) 72, DACs 70, etc.) of the gamma generator 58 may be powered by a supply voltage 98, VDD. In some embodiments, the supply voltage 98 may provide sufficient voltage to operate the circuitry of the first generator stage 74 and second generator stage 76 at the maximum brightness setting with a buffer 100 (e.g., headroom) therebetween. As should be appreciated and as an example, circuitry, such as an amplifier 72, may operate based on a supply voltage 98 greater than or equal to that of the signal being amplified.

The buffer 100 may provide headroom for operation of the circuitry of the gamma generator 58. Moreover, in some scenarios/implementations, at least a certain amount of buffer 100 may be desired. However, as the brightness setting 96 decreases, the analog voltage level 90 corresponding to the highest gray level 92 (e.g., GL_MAX) may also decrease, increasing the buffer 100 for at least a portion of the circuitry of the gamma generator 58. For example, the second generator stage 76, receiving the tap voltages 82, may have a maximum signal voltage corresponding to that of the highest gray level 92, which may decrease with the brightness setting 96. As such, portions of the gamma generator 58, such as the second generator stage 76 (e.g., the amplifiers 72 and/or resistor string 78 of the second generator stage 76) may be supplied with a variable supply voltage 102 that is based on the brightness setting 96 to realize a power savings 104 that would otherwise be lost as unnecessary buffer 100.

Returning to FIG. 9, the supply voltage 98 may be provided to portions of the gamma generator 58 that operate on certain voltage signals, such as the high reference voltage, $V_{ref\,H}$, digital circuitry such as multiplexers 80, and/or amplifiers 72 or other circuitry demanding the full supply voltage 98, such as to maintain a settling time. However, in some embodiments, portions of the gamma generator 58, such as the amplifiers 72 and/or resistor string 78 of the second generator stage 76 may be provided with a variable supply voltage 102 that can be reduced to less than the full supply voltage 98, based on the brightness settings 96. For example, a voltage regulator 106 (e.g., voltage regulating circuitry) may adjust the variable supply voltage 102 based on a voltage control signal 108 corresponding to the brightness setting 96 of the electronic display 12. The voltage regulator 106 may include any suitable circuit for adjusting the variable supply voltage 102, such as a DAC 70, power-management integrated circuit (PMIC), multiplexer 80, or other power adjusting circuit. Additionally or alternatively, in some embodiments, circuitry of the pixel drive circuitry 54, such as the source amplifiers 66, may also be provided with the variable supply voltage 102. Indeed, as the analog voltages are supplied from the gamma bus 60 to the pixel drive circuitry 54, the power savings 104 may be achieved with the source amplifiers 66 in addition to circuitry of the gamma generator 58. Furthermore, in some embodiments, the one or more portions of the gamma generator 58 and the pixel drive circuitry 54 may be provided the variable supply voltage 102 by the same or separate voltage regulators 106. Furthermore, in some embodiments, the variable supply voltage 102 supplied to circuitry of the gamma generator 58 and the pixel drive circuitry 54 may be the same voltage (e.g., based on the brightness setting 96) or separate voltages, each having a different relationship with the brightness setting 96.

In some embodiments, the voltage control signal 108 may be generated by the controller 42, which may be a part of or implemented as a timing controller (TCON) of the electronic display 12, the processor core complex 18, or as a separate controller receiving the brightness setting 96 or a signal indicative thereof. The voltage control signal 108 may be generated based on the brightness setting of the electronic display 12 to instruct the voltage regulator(s) 106 to adjust the variable supply voltage(s) 102 for circuitry of the gamma generator 58 (e.g., the second generator stage 76) and/or pixel drive circuitry 54.

In some embodiments, the controller 42 may include an algorithm or look-up-table (LUT) correlating different brightness settings 96 to different variable supply voltages 102. For example, the controller 42 may receive the current brightness setting 96, reference a LUT based thereon to generate the voltage control signal 108, and provide the voltage control signal 108 to the voltage regulator 106. Moreover, entries of the LUT may be interpolated therebetween based on brightness setting tap points, or ranges of brightness settings 96 may correspond to discrete voltage levels for the variable supply voltage 102. Furthermore, in some embodiments, the controller 42 may be implemented in the voltage regulator 106, or vice versa, for example, such that the variable supply voltage 102 is based directly on the brightness setting 96.

Additionally, in some embodiments, the controller 42 may assess changes to the variable supply voltage 102 based on real time changes to the brightness setting 96. For example, the variable supply voltage 102 may be changed on a per frame or per sub-frame basis, such as during non-emission times (e.g., VBlank). As should be appreciated, in some scenarios, a display pixel 56 may emit light for only a portion of the time between beginnings of image frames. As such, a non-emission time, such as a blank period (e.g., VBlank) may exist between pixel emissions, such that the variable supply voltage 102 may be changed without causing or with minimal voltage anomalies, which may cause image artifacts (e.g., color/brightness distortions) to be displayed.

As discussed above, the supply voltage (e.g., variable supply voltage 102) supplied to portions of the gamma generator 58 and/or pixel drive circuitry 54 may be adjusted based on the brightness setting 96 of the electronic display 12 to incur a power savings 104, while maintaining a desired buffer 100 (e.g., headroom). Additionally or alternatively to adjusting the variable supply voltage 102 (e.g., via the voltage regulator(s) 106), in some embodiments, the bias current of the amplifiers 72 of the gamma generator 58 may be reduced based on the brightness setting 96. For example, a current regulator 110 (e.g., current regulating circuitry) may receive a current control signal 112 (e.g., via the controller 42) and reduce the bias current of the amplifiers 72 (e.g., of the first generator stage 74 and/or the second generator stage 76), increasing efficiency and saving power.

As discussed above, the voltage span 84 may change depending on the brightness setting 96, reducing the analog voltage level 90 associated with the highest gray level 92. Additionally, as the brightness setting 96 decreases, the range of the voltage span 84 (e.g., difference between the analog voltage level 90 of the highest gray level 92 and the zero gray level 94) is reduced. The reduced range of the voltage span 84 may reduce fluctuations, settling times, and/or deviations from the desired (e.g., ideal) analog voltages generated by and output from the gamma generator 58. In general, increased bias currents of amplifiers 72 may provide reduced distortion. However, with the reduced range of the voltage span 84 associated with a reduced brightness setting 96, distortions/deviations from the desired analog voltage may be reduced and/or have reduced impact on perceivable brightness deviations (e.g., as output from the display pixels 56). As such, in some embodiments, the current regulator 110 reduce the bias current to amplifiers 72 of the first generator stage 74 and/or the second generator stage 76 according to a reduced brightness setting, without introducing perceivable image artifacts (e.g., luminance output distortions).

As should be appreciated, the current regulator 110 may include any suitable circuitry for regulating the bias current of the amplifiers 72. For example, a current regulator 110 may include a set of current emitters in parallel, such that the current control signal 112 enables or disables a number of the current emitters (e.g., depending on the brightness setting 96) to provide an adjustable amount of bias current to the amplifier 72. Furthermore, while shown in FIG. 9 as a single current regulator 110, as should be appreciated, a single circuit may be coupled to multiple amplifiers 72 and/or each amplifier 72 may have dedicated current regulator circuitry for controlling the bias current of the corresponding amplifier 72. Furthermore, although shown with relation to the set of amplifiers 72 of the second generator stage 76, in some embodiments, the bias current of some or all of the amplifiers 72 of the first generator stage 74 may also be adjusted based on the brightness setting 96. For example, a set of amplifiers 72 buffering the tap voltage 82 may be coupled to current regulator(s) 110 to adjust the bias currents thereof. Additionally, amplifiers 72 of different stages of the gamma generator 58 (e.g., the first generator stage 74 and the second generator stage 76) may be set with different bias currents (e.g., having different profiles relative to the brightness setting 96). Moreover, amplifiers 72 of a particular stage of the gamma generator 58 (e.g., the first generator stage 74 or the second generator stage 76) may be set to the same bias current or have different bias currents, such as based on their analog voltage level 90.

As discussed above with regards to the voltage regulator 106 and voltage control signal 108, the current regulator 110 and current control signal 112 may be governed by a controller 42, which may be or be within the TCON of the electronic display 12, the processor core complex 18, or other circuitry of the electronic device 10. The controller 42 may correlate different brightness settings 96 with corresponding amounts of desired bias current, such as based on an algorithm, stored LUT, comparators (e.g., comparing the brightness setting 96 or a measure of the voltage span 84 to one or more thresholds), and/or any interpolation thereof. Furthermore, the controller 42 may correlate the different brightness settings 96 with ranges of voltage spans 84 and determine the bias currents from the range of the voltage span 84. Moreover, in some embodiments, the current control signal 112 may be indicative of the brightness setting 96, and the current regulator(s) 110 may operate based on bits of the current control signal 112. For example, a set of current emitters in parallel, as discussed above, may be enabled or disabled based on a binary or thermometrically coded current control signal indicative of the brightness setting 96. Further, the different bias currents provided to the amplifiers 72 may be continuous or at discrete bias current levels. Additionally, the bias current may be adjusted on a per frame or per sub-frame basis, such as during non-emission times of the display panel 40 (e.g., during a VBlank period).

Figure 12:
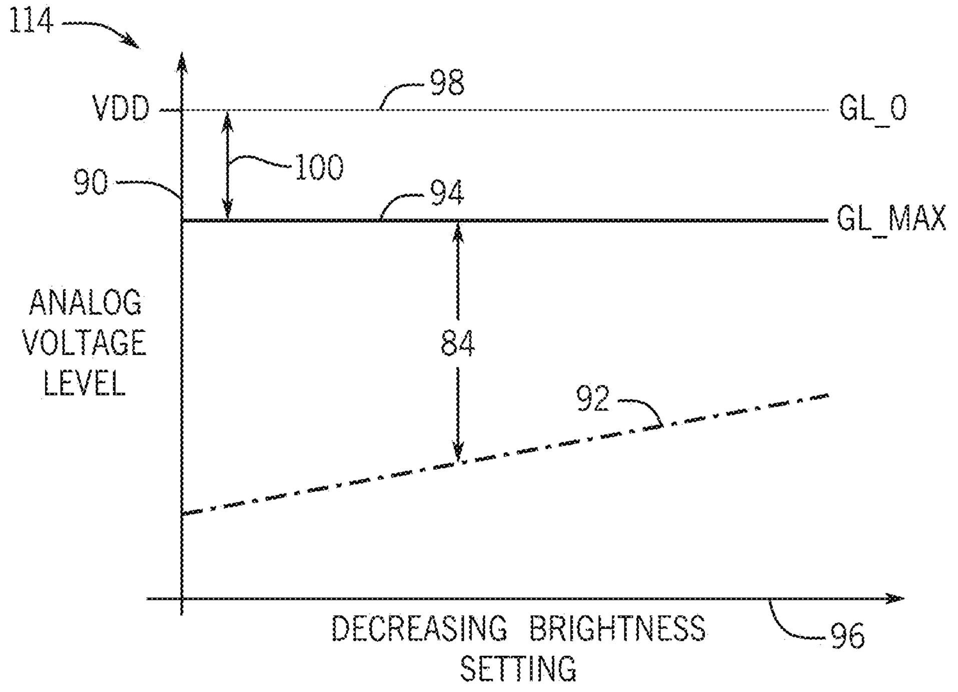
FIG. 12 is a graph of the analog voltage levels corresponding to a highest gray level and a zero gray level of a display panel having a relatively constant buffer across different brightness settings, with respect to a decreasing brightness setting, in accordance with an embodiment.

As discussed above with regards to FIGS. 10 and 11, for certain types of electronic displays 12, such as those having NMOS or self-emissive display pixels 56, the analog voltage level 90 for the highest gray level 92 may decrease as the brightness setting 96 decreases also reducing the range of the voltage span 84. As such, the techniques for decreasing the variable supply voltage 102 and/or reducing bias currents regulator 110 may be utilized in such electronic displays. However, some electronic displays 12, such as those having PMOS display pixels 56 (e.g., low-temperature polycrystalline silicon (LTPS) displays, low-temperature polycrystalline oxide (LTPO) displays, etc.) may utilize a constant, or approximately constant, analog voltage level 90 for the highest gray level 92, regardless of brightness setting 96, and the analog voltage level 90 of the zero gray level 94, may increase as the brightness setting 96 decreases. To help illustrate, FIG. 12 is a graph of the analog voltage levels 90 corresponding to a highest gray level 92 and a zero gray level 94 of a display panel 40 having a relatively constant buffer 100 (e.g., headroom) across different brightness settings 96. Due to the relatively constant buffer 100 across different brightness settings 96, reducing the supply voltage 98 in such display panels 40 may be less or not viable. However, the voltage span 84 is still reduced in such display panels 40. Therefore, the bias current reduction technique discussed herein may be viable in such electronic displays 12 to reduce power consumption.

As should be appreciated, while discussed herein as having two stages (e.g., first generator stage 74 and second generator stage 76), the gamma generator 58 may include any number of stages or be combined without discernable stages. Moreover, while the above techniques are discussed as being utilized in certain parts of the gamma generator 58 and/or electronic display 12, the techniques may be utilized in any suitable portions thereof. For example, the bias current may be adjusted on any circuitry where the reduced voltage span 84 (e.g., based on the brightness setting 96) reduces the likelihood of perceivable luminance distortions, and the variable supply voltage 102 may be supplied to any portion of the gamma generator 58 operating on signals that vary based on the brightness setting, any of which may vary based on implementation.

Figure 13:
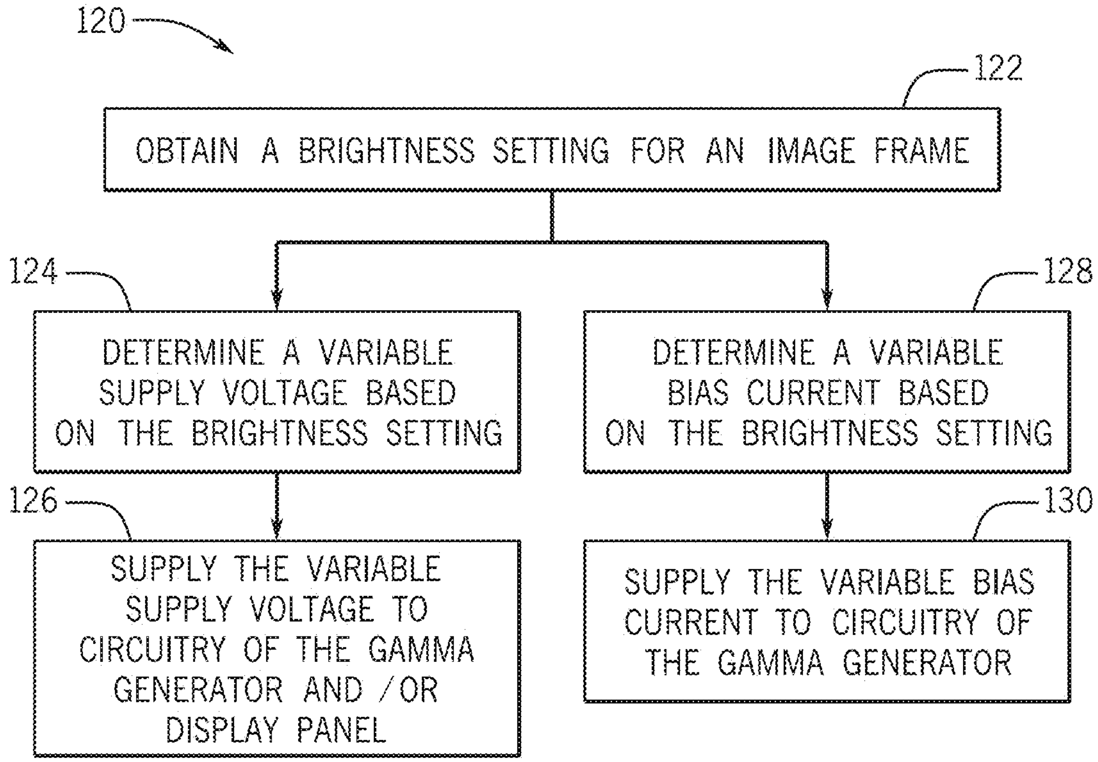
FIG. 13 is a flowchart of an example process for reducing power consumption by regulating the voltage and/or bias current of circuitry of the gamma generator and/or electronic display of FIG. 8, in accordance with an embodiment.

FIG. 13 is a flowchart 120 of an example process for reducing power consumption by regulating the variable supply voltage 102 and/or bias current of circuitry of the gamma generator 58 and/or the electronic display 12. A brightness setting 96 may be obtained for an image frame (process block 122). For example, a user setting, ambient light sensor, time of day, etc. may be used by the electronic device 10 to determine a brightness setting 96, and the brightness setting 96 may be conveyed to a controller 42. Additionally, a variable supply voltage 102 may be determined based on the brightness setting (process block 124). For example, at decreased brightness settings, the variable supply voltage 102 may be decreased such that a buffer 100 is maintained above the analog voltage level 90 of the highest gray level 92. The variable supply voltage 102 may then be supplied to circuitry of the gamma generator 58 and/or display panel 40 (process block 126). For example, a voltage regulator 106 may receive a voltage control signal 108 indicative of or based on the brightness setting 96 to adjust the variable supply voltage 98 to amplifiers 72 of the second generator stage 76, the source amplifiers 66 of the pixel drive circuitry 54, and/or other circuitry, such as amplifiers 72 of the first generator stage 74.

Additionally or alternatively to adjusting the variable supply voltage 102, a variable bias current may be determined based on the brightness setting (process block 128). For example, a controller may determine a decreased bias current at decreased brightness settings 96 (e.g., brightness settings 96 less than the maximum brightness setting 96). Additionally, the variable bias current may be supplied to circuitry of the gamma generator 58 (process block 130). For example, a decreased bias current may be supplied to amplifiers of the gamma generator 58 (e.g., amplifiers 72 of the second generator stage 76, amplifiers 72 buffering the tap voltages 82 in the first generator stage 74, and/or other amplifiers 72 of the gamma generator 58) in response to a decreased brightness setting. As such, supply voltages and/or bias currents supplied to circuitry of the gamma generator 58 and/or electronic display 12 may be reduced based on the brightness setting 96 to provide power savings without introducing perceivable luminance distortions.

The specific embodiments described above have been shown by way of example, and it should be understood that these embodiments may be susceptible to various modifications and alternative forms. Moreover, although the above referenced flowchart 120 is shown in a given order, in certain embodiments, process/decision blocks may be reordered, altered, deleted, and/or occur simultaneously. Additionally, the referenced flowchart 120 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

a display panel comprising a plurality of display pixels and pixel drive circuitry configured to drive one or more display pixels of the plurality of display pixels based on a set of analog voltages in accordance with display image data;

a gamma generator, which comprises one or more digital-to-analog converters, configured to generate the set of analog voltages; and a voltage regulator configured to adjust a supply voltage to a portion of the gamma generator based on a display brightness value of the display panel.

2. The electronic device of claim 1, comprising current regulating circuitry configured to adjust a bias current of an amplifier of the gamma generator based on the display brightness value.

3. The electronic device of claim 2, wherein the current regulating circuitry comprises a plurality of current emitters disposed in parallel, wherein the current regulating circuitry is configured to enable a number of the current emitters based on the display brightness value, and wherein the number is larger for a first display brightness value than for a second display brightness value less than the first display brightness value.

4. The electronic device of claim 1, wherein the gamma generator comprises a first generator stage configured to generate a set of tap voltages and a second generator stage configured to generate the set of analog voltages based on the set of tap voltages, wherein the second generator stage comprises a plurality of amplifiers configured to buffer the set of tap voltages, the set of analog voltages, or both, and wherein the portion of the gamma generator comprises the plurality of amplifiers such that the voltage regulator is configured to adjust the supply voltage to the plurality of amplifiers based on the display brightness value.

5. The electronic device of claim 4, comprising current regulating circuitry configured to adjust bias currents of the plurality of amplifiers based on the display brightness value.

6. The electronic device of claim 1, wherein the pixel drive circuitry comprises a source amplifier configured to buffer an analog voltage, of the set of analog voltages, provided to a pixel of the plurality of display pixels, and wherein the voltage regulator is configured to adjust the supply voltage to the source amplifier based on the display brightness value.

7. The electronic device of claim 6, wherein the voltage regulator is configured to provide the adjusted supply voltage to the source amplifier and the portion of the gamma generator.

8. The electronic device of claim 1, comprising a controller configured to:

generate a voltage control signal based on the display brightness value; and provide the voltage control signal to the voltage regulator to regulate adjustment of the supply voltage, wherein the controller is configured to instigate changes to the supply voltage during a non-emission period of the plurality of display pixels between a first beginning of a first image frame and a second beginning of a second image frame immediately subsequent to the first image frame.

9. The electronic device of claim 1, wherein the voltage regulator comprises a power management integrated circuit (PMIC).

10. The electronic device of claim 1, wherein the plurality of display pixels comprises a plurality of organic light emitting diodes (OLEDs).

11. The electronic device of claim 1, wherein the display brightness value is based on a user input, an ambient light reading, a time of day, or any combination thereof.

12. A method comprising:

obtaining, via a controller, a display brightness value of a display panel for an image frame;

determining, via the controller, a supply voltage based on the display brightness value; and supplying, via a voltage regulator, the supply voltage to at least one of a plurality of amplifiers of a gamma generator of the display panel and a plurality of source amplifiers of pixel drive circuitry of the display panel, wherein the gamma generator comprises one or more digital-to-analog converters.

13. The method of claim 12, comprising:

determining a bias current based on the display brightness value; and supplying, via current regulating circuitry, the bias current to the plurality of amplifiers of the gamma generator.

14. The method of claim 12, wherein the gamma generator comprises a first generator stage configured to generate a set of tap voltages and a second generator stage configured to generate a set of analog voltages based on the set of tap voltages, wherein the pixel drive circuitry is configured to drive display pixels of the display panel based on the set of analog voltages in accordance with display image data, and wherein the second generator stage comprises the plurality of amplifiers.

15. An electronic device comprising:

a display panel comprising a plurality of display pixels and pixel drive circuitry configured to drive one or more display pixels of the plurality of display pixels based on a set of analog voltages in accordance with display image data;

a gamma generator, which comprises one or more digital-to-analog converters, configured to generate the set of analog voltages; and current regulating circuitry configured to adjust a bias current of an amplifier of the gamma generator based on a display brightness value of the display panel.

16. The electronic device of claim 15, comprising a voltage regulator configured to adjust a supply voltage to a portion of the gamma generator, a portion of the pixel drive circuitry, or both, based on the display brightness value.

17. The electronic device of claim 16, wherein the voltage regulator is configured to adjust the supply voltage to the portion of the pixel drive circuitry, wherein the portion of the pixel drive circuitry comprises a plurality of source amplifiers configured to provide selected analog voltages of the set of analog voltages to display pixels of the plurality of display pixels.

18. The electronic device of claim 15, wherein the gamma generator comprises a first generator stage configured to generate a set of tap voltages and a second generator stage configured to generate the set of analog voltages based on the set of tap voltages, wherein the second generator stage comprises a plurality of amplifiers configured to buffer the set of tap voltages, the set of analog voltages, or both, and wherein the plurality of amplifiers comprises the amplifier such that the current regulating circuitry is configured to adjust the bias current to the amplifier based on the display brightness value.

19. The electronic device of claim 18, wherein the first generator stage comprises a second plurality of amplifiers configured to buffer the set of tap voltages, and wherein the current regulating circuitry is configured to adjust the bias current to the second plurality of amplifiers.

20. The electronic device of claim 15, comprising a controller configured to:

generate a current control signal based on the display brightness value; and provide the current control signal to the current regulating circuitry to regulate adjustment of the bias current, wherein the controller is configured to instigate changes to the bias current during a non-emission period of the plurality of display pixels between a first beginning of a first image frame and a second beginning of a second image frame immediately subsequent to the first image frame.

* * * * *